United States Patent

Matsuo et al.

[11] Patent Number: 5,929,149
[45] Date of Patent: Jul. 27, 1999

[54] RUBBER COMPOSITION FOR TIRE TREAD

[75] Inventors: Toshiro Matsuo, Kakogawa; Hayato Saba, Ichihara, both of Japan

[73] Assignee: Sumitomo Rubber Industries, Ltd., Hyogo-ken, Japan

[21] Appl. No.: 08/990,736

[22] Filed: Dec. 15, 1997

[30] Foreign Application Priority Data

Dec. 17, 1996 [JP] Japan ..................... 8-336787

[51] Int. Cl.$^6$ ...................... C08K 5/24
[52] U.S. Cl. .................. 524/262; 524/493; 524/494; 524/496
[58] Field of Search ................ 524/493, 495, 524/496, 262; 525/105

[56] References Cited

U.S. PATENT DOCUMENTS

| | | | |
|---|---|---|---|
| 3,244,664 | 4/1966 | Zelinski et al. | 525/105 |
| 3,692,874 | 9/1972 | Farrar et al. | 525/105 |
| 4,185,042 | 1/1980 | Verkouw | 525/332 |
| 5,066,721 | 11/1991 | Hamada et al. | 525/105 |
| 5,401,789 | 3/1995 | Wolff et al. | 524/495 |
| 5,409,969 | 4/1995 | Hamada | 523/213 |
| 5,496,883 | 3/1996 | Hamada | 524/495 |
| 5,508,333 | 4/1996 | Shimizu | 525/105 |

FOREIGN PATENT DOCUMENTS

| | | |
|---|---|---|
| 0520279A2 | 12/1992 | European Pat. Off. . |
| 0661298A2 | 7/1995 | European Pat. Off. . |
| 46-9355 | 3/1971 | Japan ................. 525/105 |
| 56-104906 | 8/1981 | Japan ................. 525/105 |
| 09110904 | 10/1995 | Japan . |

*Primary Examiner*—Veronica P. Hoke
*Attorney, Agent, or Firm*—Birch, Stewart, Kolasch & Birch, LLP

[57] ABSTRACT

A rubber composition for a tire tread includes an organosiloxane-modified diene polymer or a blend of the organosiloxane-modified diene polymer with another diene polymer and a silica or a mixture of the silica and carbon black, the organosiloxane-modified diene polymer being obtained by (a) polymerizing a diene monomer alone or a mixture of the diene monomer and aromatic vinyl monomer by the use of an alkali metal-containing polymerization initiator in a hydrocarbon solvent to give a diene polymer having an alkali metal-containing active end, and (b) reacting the alkali metal-containing active end of the diene polymer with an organosiloxane having at least one functional group selected from epoxy, alkoxyl, carbonyl, vinyl, chloro, bromo and iodo groups. The rubber composition for a tire tread is superior in processability and has both low rolling resistance and high wet-skid resistance by employing a decreased amount of a silane coupling agent.

6 Claims, No Drawings

RUBBER COMPOSITION FOR TIRE TREAD

TECHNICAL FIELD

The present invention relates to a rubber composition for a tire tread.

BACKGROUND OF THE INVENTION

Hitherto, from aspects of environments and resources, low fuel consumption (low rolling resistance) is strongly desired from vehicle tires. Further, superior wet-skid resistance is required from the viewpoint of safety and superior wear resistance is required from the viewpoint of durability.

When the carbon black content of a rubber composition which is utilized for a tire is increased for improving wear resistance, the value of tanδ (70° C.) becomes large and rolling resistance is also increased. Therefore, it is well known to employ silica instead of carbon black.

In such a case, it is also well known that a silane coupling agent can be employed to give reinforcement by improving the bonding ability (reactivity) between the silica and rubber components of a rubber composition.

However, there is a problem that a silane coupling agent is expensive which makes the cost of the tire higher as the mixing amount is increased.

There is disclosed, for example, in JP-B-80503/1993 the technology wherein reinforcement is obtained by reacting an alkoxysilane which is an organic silicon compound, of the one or make ends of a polymer molecule of rubber components in a rubber composition to chemically bond the alkoxysilane with silica.

According to the prior technology described in the publication, although reinforcement of the resulting rubber composition can be improved, there arises a problem that it is necessary to add a silane coupling agent because the processability of the rubber composition is inferior in the not-vulcanized state. Further the publication is silent on compatibility between low rolling resistance and high wet-skid resistance.

Considering the above-mentioned facts, an object of the present invention is to obtain a rubber composition for a tire tread which is superior in processability and has both low rolling resistance and high wet-skid resistance by decreasing the mixing amount of the silane coupling agent.

SUMMARY OF THE INVENTION

The present invention relates to a rubber composition for a tire tread comprising an organosiloxane-modified diene polymer or a blend of the organosiloxane-modified diene polymer with another diene polymer and silica or a mixture of the silica and carbon black, wherein the organosiloxane-modified diene polymer is obtained by (a) polymerizing a diene monomer alone or a mixture of the diene monomer and an aromatic vinyl monomer by the use of an alkali metal-containing polymerization initiator in a hydrocarbon solvent to give a diene polymer having an alkali metal-containing active end, and (b) reacting the alkali metal-containing active end of the diene polymer with an organosiloxane having at least one functional group selected from the group consisting of epoxy, alkoxyl, carbonyl, vinyl, chlorine atom, bromine atom and iodine atom.

The organosiloxane is preferably represented by the general formula (I):

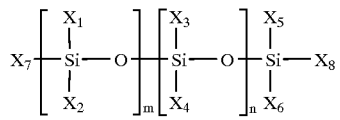

wherein $X_1$ to $X_8$ are the same or different and each is an alkoxy, vinyl, chlorine atom, bromine atom, iodine atom, a hydrocarbon residue having at least one thereof, a hydrocarbon residue having an apoxy group, a hydrocarbon residue having a carbonyl group, a hydrogen atom, and an alkyl or phenyl group, each of m and n is an integer of 0 to 100, provided that m and n are not zero at the same time.

The rubber composition for the tire tread of the present invention is preferably obtained by mixing, per 100 parts by weight of the organosiloxane-modified polymer or the blend, 30 to 90 parts by weight of the silica and 0 to 40 parts by weight of the carbon black, wherein a weight ratio of the carbon black to the silica is not higher than 1.0.

Further, the rubber composition for the tire tread of the present invention is preferably obtained by adding the silane coupling agent in an amount of 5 to 15% by weight of the silica.

The silane coupling agent is preferably bis-((triethoxy)silylpropyl)tetrasulfide or γ-mercaptopropyltrimethoxysilane.

DETAILED DESCRIPTION

According to the present invention, first, the diene monomer alone or a mixture of the diene monomer and the aromatic vinyl monomer is polymerized in a hydrocarbon solvent by the use of an alkali metal-containing polymerization initiator to give a diene polymer (hereinafter referred to as "diene polymer A") having an alkali metal-containing active end.

Then, the alkali metal-containing active end of the diene polymer A is reacted with an organosiloxane having at least one functional group selected from the group consisting of an epoxy, an alkoxy, a carbonyl, a vinyl, a chlorine atom, a bromine atom and an iodine atom to give an organosiloxane-modified diene polymer. In the organosiloxane-modified diene polymer, the organosiloxane is chemically bonded with the alkali metal-containing active end portion of the diene polymer. It is presumed that the above-mentioned functional group of the organosiloxane is chemically bonded with or has a chemical affinity for a functional group such as silanol or siloxane on the surface of the silica.

Through such a mechanism (interaction), the rubber composition for the tire tread of the present invention has good reinforcement and superior processability in a not-vulcanized state.

The diene monomer may be a conjugated diene monomer. Examples of the diene monomer are, for instance, butadiene, isoprene, 1,3-pentadiene (piperylene), 2,3-dimethyl-1,3-butadiene, 1,3-hexadiene and the like, from viewpoint of general use and low cost. Among them, butadiene is preferable from viewpoint of low cost and easy production.

The aromatic vinyl monomer which is polymerized with the diene monomer may be an aromatic vinyl monomer which is soluble in an organic solvent. Examples of the aromatic vinyl monomer are, for instance, styrene, α-methylstyrene, vinyltoluene, vinylnaphthalene, divinylbenzene, divinylnaphthalene and the like from a viewpoint of general use.

The mixing amount of the diene monomer to the aromatic vinyl monomer is preferably 95/5 to 55/45 by weight, further preferably 90/10 to 60/40.

The alkali metal-containing polymerization initiator employed in the present invention can initiate polymerization of the diene monomer alone or copolymerization of the diene monomer and aromatic vinyl monomer, and provide a resulting polymer with the alkali metal-containing active end. Examples of the alkali metal-containing polymerization initiator are, for instance, an organic lithium-containing catalyst such as an alkyllithium, an alkenyllithium or an alkylenedilithium from the viewpoint that those are general and inexpensive, and chemically stable during polymerization.

In the present invention, either the polymerization of the diene monomer or the copolymerization of the diene monomer and aromatic vinyl monomer can be carried out by the use of the alkali metal-containing polymerization initiator in a conventional manner. Polymerization temperature is preferably 0° to 150° C. from viewpoints of economy and less side reaction, further preferably 30 to 80° C.

The hydrocarbon solvent in the present invention may be a solvent usually employed for polymerizing a monomer. Examples of the solvent are, for instance, an aromatic hydrocarbon such as benzene, toluene, xylene or ethylbenzene; an aliphatic hydrocarbon such as hexane or heptane; an alicyclic hydrocarbon such as cyclopentane, cyclohexane or methylcyclohexane, and the like.

A weight average molecular weight (Mw) of the resulting diene polymer A to a number average molecular weight (Mn) of the diene polymer A, i.e. Mw/Mn may be preferably 1.2 to 3.0, further preferably 1.5 to 2.4, from the viewpoint that rolling resistance is decreased.

Subsequently, according to the present invention, an organosiloxane is reacted with the diene polymer A having the alkali metal-containing active end. The organosiloxane can chemically react with the diene polymer A having the alkali metal-containing active end to produce an organosiloxane-modified diene polymer. Also, through its functional groups, the organosiloxane can be chemically bonded with silica in the rubber composition for tire tread; from the viewpoints of a decrease in rolling resistance and increase in wet-skid resistance, it is preferable to employ an organosiloxane represented by the general formula (I):

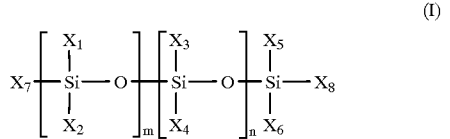

(I)

wherein $X_1$ to $X_8$ are the same or different and each is an alkoxy, vinyl, chlorine atom, bromine atom, iodine atom, a hydrocarbon residue having at least one thereof, a hydrocarbon residue having epoxy, a hydrocarbon residue having carbonyl, hydrogen atom, an alkyl or phenyl, each of m and n is an integer of 0 to 100, provided that m and n are not zero at the same time. In addition, from viewpoints of increase in vulcanizing rate and in mechanical strength of the vulcanized resulting rubber composition and improvement in kneading processability, each of m and n is preferably an integer of 1 to 50, further preferably an integer of 2 to 10.

Examples of the organosiloxane represented by the formula (I) are, for instance, diglycidoxypolydimethylsiloxane, dimethyl(methoxy-methylsiloxane)polydimethylsiloxane, dimethyl(acetoxy-methylsiloxane)polydimethylsiloxane, diglycidylpolysiloxane, dichloropolydimethylsiloxane, and the like.

When the organosiloxane is reacted with the diene polymer A having the alkali metal-containing active end, the organosiloxane is added to the diene polymer A in the organic solvent. At the time of the addition, the organosiloxane has 4 to 50 of the above-mentioned functional group, further preferably 4 to 20 so that a viscosity of the mixture increases not so high and that processability is not decreased.

In the present invention, the reaction of the organosiloxane with the diene polymer A proceeds rapidly, and a reaction temperature and a reaction time can be varied in broad ranges. Preferably, the reaction is carried out at room temperature to 100° C. for several seconds to several hours, further preferably at 30° to 80° C. for 5 minutes to one hour as usual. The reaction can be carried out by bringing the organosiloxane into contact with the diene polymer A in the organic solvent. For example, the organosiloxane may be added into the solution of the diene polymer A having the alkali metal-containing active end obtained by using the alkali metal-containing polymerization initiator in the hydrocarbon solvent.

The other diene polymer (hereinafter referred to as "diene polymer B") which is mixed with the organosiloxane-modified diene polymer in the present invention may be a diene polymer conventionally employed in the field of tires. Examples of the diene polymer B are, for instance, natural rubber (NR), isoprene rubber (IR), styrene/butadiene rubber (SBR), ethylene/propylene/diene rubber (EPDM), butyl rubber (IIR), styrene/isoprene rubber (SIR) and isoprene/butadiene rubber (IBR). Each of the diene polymer B can be employed alone or in an optional combination. It is preferable to employ NR, SBR, IR from viewpoints of general use and low cost. It is further preferable to employ NR, SBR from viewpoints of good rolling resistance and processability. With respect to SBR, it is preferable to employ a solution polymerized SBR from a viewpoint of good balance between rolling resistance and wet-skid resistance.

The organosiloxane-modified diene polymer may be employed alone. When the diene polymer B is blended with the organosiloxane-modified diene polymer, a mixing percentage of the organosiloxane-modified diene polymer in the blend is preferably 50 to 20% by weight from viewpoints of good processability and wear resistance.

The method of the mixing in this step can be carried out in a conventional manner.

The silica of the present invention can be a silica employed conventionally in the field of tires. An average particle size of the silica is preferably 10 to 50 nm from viewpoints of good dispersibility of the silica and wear resistance of a resulting composition, further preferably 15 to 30 nm from a viewpoint of good balance between wet-skid resistance and rolling resistance.

In the present invention, the carbon black, which can be mixed in addition to the silica, may be a conventional carbon black such as acetylene black or furnace black which is employed in the field of tires. An average particle size of the carbon black is preferably 15 to 40 nm from viewpoints of good dispersibility of the carbon black and wear resistance of a resulting composition, further preferably 16 to 28 nm from a viewpoint of good wet-skid resistance.

Basically, the rubber composition for tire tread of the present invention is obtained by mixing the silica or a mixture of the silica and carbon black with the organosiloxane-modified diene polymer or a mixture of the organosiloxane-modified diene polymer and diene polymer B. Further in detail, the rubber composition of the present invention may be obtained by admixing the silica in an amount of 10 to 90 parts by weight and the carbon black in an amount of 0 to 50 parts by weight to 100 parts by weight of the organosiloxane-modified diene polymer or the blend. From a viewpoint of good balance between wet-skid resistnace and rolling resistance, 30 to 90 parts by weight of the silica and 0 to 40 parts by weight of the carbon black are preferably admixed. Further, from a viewpoint of improvement in wet-skid resistance, 30 to 80 parts by weight of the silica and 10 to 30 parts by weight of the carbon black are preferably admixed.

As the method of the mixing in this step, it is preferable that the silica is mixed with the organosiloxane-modified diene polymer or the blend to given a mixture in first and, then, the carbon black is admixed with the mixture.

Also, in order to further improve processability of the rubber composition for tire tread of the present invention, before reacting the organosiloxane with the diene polymer A, a coupling agent having 3 to 4 functional groups may be added and reacted with a polymer chain of the diene polymer A at its succesively polymerizable growth end to branch the diene polymer A partially.

The coupling agent has preferably 3 to 4 functional groups from a viewpoint of improvement of flow resistance of a resulting composition. Examples of the coupling agent are, for instance, tin tetrachloride, silicon tetrachloride, silicon tetrabromide, silicon tetralodide, germanium tetrachloride, methyltrichlorosilane, butyltrichlorotin, bistrichlorosilylethane, trichloroethane, bis-((triethoxy)-silylpropyl)tetrasulfide, γ-mercaptopropyltrimethoxysilane, vinyltriethoxysilane and the like. Among them, silicon tetrachloride and tin tetrachloride are preferable from a viewpoint of commercial availability. Also, from viewpoints of high reinforcement and good rolling resistance, bis-((triethoxy)silylpropyl)tetrasulfide, γ-mercaptopropyltrimethoxysilane and vinyltriethoxysilane are further preferable.

The silane coupling agent is used for bonding the silica with the organosiloxane-modified polymer chemically and improving wear resistance of a resulting composition. Preferably the amount of the silane coupling agent is 5 to 15% by weight of the silica from the viewpoint of good wear resistance, more preferably 7 to 13 % by weight of the silica from the viewpoint of good balance between wear resistance and rolling resistance.

Into the rubber composition for tire tread of the present invention, in addition to the above-mentioned components, components usually added in the field of tires, e.g. a vulcanizing agent such as sulfur, a vulcanization accelerator, a process oil, an antioxidant and a vulcanization assistant can be mixed optionally in a range not to decrease the effect of the present invention.

As the method of the mixing, it is preferable that the organosiloxane-modified polymer or the blend, the silica and the coupling agent are mixed to obtain a first mixture and, then, the carbon black, process oil and, further, antioxidant, vulcanization assitant, vulcanizing agent, vulcanization accelarator mixed with the first mixture in this order.

In the following, the present invention is explained specifically on the basis of Examples, but the present invention is not limited to the Examples.

PREPARATION EXAMPLES 1 to 14

20 Liter polymerization reactor of stainless steel was purged with dry nitrogen and then, charged with 1420 g of 1,3-butadiene, 580 g of styrene, 15 l of n-hexane, 195 g of tetrahydrofuran and 8.7 ml of n-butyllithium (as n-hexane solution). The polymerization was carried out at 65° C. for 4 hours with agitation to obtain a polymer solution containing the styrene/butadiene rubber which is the diene polymer A having an alkali metal (lithium) active end. Into the polymer solution, the organosiloxane shown in Tables 1 and 2 was added such that the mole ratio of n-butyllithium to the organosiloxane became 1, followed by reacting for 30 minutes with agitation. Further, 10 ml of methanol was added and agitation was continued for 5 minutes. Then, the reaction product in the reactor was taken out and 10 g of 2,6-di-t-butyl-p-cresol (Sumilizer BHT available from Sumitomo Chemical Co., Ltd.) and 760 gram of aromatic oil (X-140 available from Kyodo Sekiyu Kabushiki Kaisha) were added thereto to obtain a mixture. After evaporating a large portion of n-hexane through steam stripping, the mixture was dried under a reduced pressure at 50° C. for 24 hours and about 2200 g of an organosiloxane-modified diene polymer was obtained.

Then, according to the mixing ratio shown in Table 2, the polymer, silica, carbon black, aromatic oil and silane coupling agent shown in Table 1 were admixed under the condition of 100° to 150° C. by using B-type bunbury mixer of 1.7 liter, followed by adding the vulcanization assistant, wax and antioxidant under the condition of 130° C. Then, the vulcanizing agent and vulcanization accelerator were admixed by means of an 8-inch roller at a temperature of not higher than 100° C. to obtain a rubber composition for tire tread.

The components employed in Preparation Examples are shown in Table 1.

TABLE 1

| Organosiloxane | | |
|---|---|---|
| A | diglycidylpolysiloxane | $X_1$ to $X_6$: methyl, $X_7$ and $X_8$: glycidyl, m = 20, n = 0 |
| B | dimethyl(methoxy-methylsiloxane) polydimethylsiloxane | $X_1$: methoxy, $X_2$ to $X_8$: methyl, m = 3, n = 36 |
| C | dimethyl(acetoxy-methylsiloxane) polydimethylsiloxane | $X_1$: acetoxy, $X_2$ to $X_8$: methyl, m = 3, n = 20 |
| D | dichloropolydimethylsiloxane | $X_1$, $X_2$, $X_5$, $X_6$: methyl, |
| E | dimethyldichlorosilane (silane coupling agent) | $X_7$ and $X_8$: chlorine atom, m = 3, n = 0 |
| Silane coupling agent | | |
| A | bis-(triethoxy)silylpropyltetrasulfide | Si69 available from DEGUSSA |
| B | γ-mercaptopropyltrimethoxysilane | KBE803 available from Shin-Etsu Chemical Co., Ltd. |
| C | vinyltriethoxysilane | KBE1003 available from Shin-Etsu Chemical Co., Ltd. |
| Silica | average particle size: 16 nm, BET: 175 $m^2$/g | Ultrasil VN3 available from DEGUSSA |
| Carbon black | average particle size: 28 nm, BET: 71 $m^2$/g | N351 available from Showa Cabot Co., Ltd. |
| Oil | high viscous aromatic oil | |

(Test Method)
Rolling Resistance

With respect to the obtained rubber compositions for tire tread, a tan δ (hystelysis loss) at 70° C. which represents a degree of rolling resistance was measured under the conditions of 10 Hz of frequency, 10% of static stress and ±1.0% of dynamic stress by means of a viscoelastic spectrometer available from Kabushiki Kaisha Iwamoto Seisakusho. The results are shown as an index in Table 2. The tan δ of the rubber composition obtained from Preparation Example 11 wherein dimethyldichlorosilane (silane coupling agent) was used instead of the organosiloxane was employed as the standard. In the following wet-skid resistance test, the standard was also the result of Preparation Example 11. It is preferable that the index is low.

Wet-skid Resistance

To measure wet-skid resistance of each rubber composition for tire tread obtained in the above, a rubber sheet (2 mm thickness) of each rubber composition was adhered to a tread portion and then, vulcanized to prepare a tire A$\mu$-S (S: slip ratio) of the tire was measured by setting the tires to a traction bus and testing in the proving ground of Sumitomo Rubber Industries, Ltd. in Okayama prefecture in Japan. The maximum of $\mu$ was shown as index to evaluate the wet-skid resistance. The results are shown in Table 2. The larger the index is, the more superior wet-skid resistance is.

(b) reacting the alkali metal-containing active end of the diene polymer with an organosiloxane having at least one functional group selected from the group consisting of epoxy, alkoxyl, carbonyl, vinyl, chloro, bromo and iodo groups, wherein the organoxsiloxane is represented by the general formula (I):

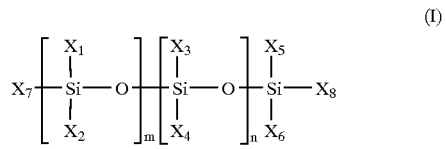

TABLE 2

|  | Preparation Example | | | | | | | | | | | | | |
|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 |
| Kind of organosiloxane | A | B | C | D | A | A | A | A | A | A | E | A | A | A |
| Organosiloxane-modified polymer (part by weight) | 100 | 100 | 100 | 100 | 70 | 70 | 100 | 100 | 100 | 100 | 100 | 100 | 100 | 100 |
| Diene polymer B |  |  |  |  |  |  |  |  |  |  |  |  |  |  |
| NR (part by weight) | — | — | — | — | 30 | — | — | — | — | — | — | — | — | — |
| SBR (part by weight) | — | — | — | — | — | 30 | — | — | — | — | — | — | — | — |
| Silica (part by weight) | 50 | 50 | 50 | 50 | 50 | 50 | 50 | 70 | 30 | 50 | 50 | 100 | 10 | 50 |
| Carbon black (part by weight) | — | — | — | — | — | — | — | — | 20 | — | — | — | 40 | — |
| Ratio of carbon black to silica | 0 | 0 | 0 | 0 | 0 | 0 | 0 | 0 | 0 | 0.6 | 0 | 0 | 4 | 0 |
| oil (part by weight) | 5 | 5 | 5 | 5 | 5 | 5 | 5 | 5 | 5 | 5 | 5 | 40 | 5 | 5 |
| Silane coupling agent |  |  |  |  |  |  |  |  |  |  |  |  |  |  |
| A (part by weight) | 4 | 4 | 4 | 4 | 4 | 4 | 6 | 6 | 3 | — | 5 | 10 | 1 | — |
| B (part by weight) | — | — | — | — | — | — | — | — | — | 5 | — | — | — | — |
| C (part by weight) | — | — | — | — | — | — | — | — | — | — | — | — | — | 5 |
| Rolling resistance | 75 | 77 | 80 | 96 | 82 | 95 | 79 | 98 | 95 | 88 | 100 | 110 | 120 | 123 |
| Wet skid resistance | 109 | 113 | 115 | 121 | 102 | 108 | 111 | 110 | 105 | 102 | 100 | 105 | 100 | 95 |

According to the present invention, a mixing amount of a silane coupling agent can be reduced as much as possible and the rubber composition containing the silica for tire tread which is superior in processability and in balance between low rolling resistance and high wet-skid resistance can be provided.

What we claimed is:

1. A rubber composition for a tire tread comprising:

(1) 100 parts by weight of an organosiloxane-modified diene polymer or a blend of the organosiloxane-modified diene polymer with another diene polymer;

(2) 30 to 90 parts by weight of a silica or a mixture of the silica and 0 to 40 parts by weight carbon black, wherein a weight ratio of the carbon black to the silica is not higher than 1.0; and (3) a silcne coupling agent in an amount of 5 to 15% by weight of the silica, wherein the silane coupling agent is bis-((triethoxy)silylpropyl)tetrasulfide or γ-mercaptopropyltrimethoxysilane, wherein said organosiloxane-modified diene polymer is obtained by (a) polymerizing a diene monomer alone or a mixture of the diene monomer and an aromatic vinyl monomer by the use of an alkali metal-containing polymerization initiator in a hydrocarbon solvent to give a diene polymer having an alkali metal-containing active end, and wherein $X_1$ to $X_8$ are the same or different and each is an alkoxy, vinyl, chloro, bromo, or iodo group, a hydrocarbon residue having at least one of these groups, a hydrocarbon residue having an epoxy group, a hydrocarbon residue having a carbonyl, hydrogen atom, alkyl or phenyl group; and each of m and n is an integer of 0 to 100, provided that m and n are not zero at the same time.

2. The rubber composition according to claim 1, wherein the diene monomer is selected from the group consisting of butadiene, isoprene, 1,3-pentadiene, 2,3-dimethyl-1,3-butadiene and 1,3-hexadiene.

3. The rubber composition according to claim 1, wherein the amount of the diene monomer with respect to the aromatic vinyl monomer is 95/5 to 55/45.

4. The rubber composition according to claim 1, wherein the organosiloxane is selected from the group consisting of diglycidoxypolydimethylsiloxane, dimethyl(methoxymethylsiloxane)polydimethylsiloxane, dimethyl(acetoxylmethylsiloxane)polydimethylsiloxane, diglycidylpolysiloxane, and dichloropolydimethylsiloxane.

5. The rubber composition according to claim 1, wherein the amount of silica is 30 to 80 parts by weight and the amount of carbon black is 10 to 30 parts by weight.

6. The rubber composition according to claim 1, wherein the amount of the silane coupling agent is 7 to 13% by weight of the silica.

* * * * *